(12) United States Patent
Lee

(10) Patent No.: US 6,611,383 B1
(45) Date of Patent: Aug. 26, 2003

(54) OPTICAL PICKUP APPARATUS HAVING WEDGE-SHAPED BEAM SPLITTER(S)

(75) Inventor: Hyoung Jae Lee, Kyunggi-do (KR)

(73) Assignee: LG Electronics Inc., Seoul (KR)

( * ) Notice: Subject to any disclaimer, the term of this patent is extended or adjusted under 35 U.S.C. 154(b) by 78 days.

(21) Appl. No.: 09/654,562

(22) Filed: Sep. 1, 2000

(30) Foreign Application Priority Data

Sep. 3, 1999 (KR) .............................................. 99-37245

(51) Int. Cl.[7] .......................... G02B 27/12; G02B 27/10
(52) U.S. Cl. .................. 359/629; 359/618; 369/112.01; 369/112.06
(58) Field of Search ................................ 359/618, 619, 359/629, 636, 637; 386/126, 128, 45; 369/112.01, 112.06

(56) References Cited

U.S. PATENT DOCUMENTS

| 5,450,378 A | * | 9/1995 | Hekker | 369/103 |
| 5,999,509 A | * | 12/1999 | Sugiura et al. | 369/112 |
| 6,031,667 A | * | 2/2000 | Sugiura et al. | 359/618 |
| 6,084,841 A | * | 7/2000 | Sugiura et al. | 369/112 |
| 6,084,845 A | | 7/2000 | Mizuno | |
| 6,275,461 B1 | * | 8/2001 | Yoo et al. | 369/112.01 |
| 6,304,540 B1 | * | 10/2001 | Yoo et al. | 369/112 |
| 6,304,541 B1 | * | 10/2001 | Chang et al. | 369/112.06 |
| 6,327,238 B1 | * | 12/2001 | Nishiwaki et al. | 369/112.21 |

FOREIGN PATENT DOCUMENTS

| JP | 62-92144 | 4/1987 |
| JP | 63052341 | 3/1988 |
| JP | 6-20291 | 1/1994 |
| JP | 6-103605 | 4/1994 |

\* cited by examiner

*Primary Examiner*—Georgia Epps
*Assistant Examiner*—Alicia M Harrington
(74) *Attorney, Agent, or Firm*—Birch, Stewart, Kolasch & Birch, LLP

(57) ABSTRACT

The optical pickup includes one or more light sources and beam splitter which is placed in the light-incident path beginning from the light sources and selectively reflects or transmits the light beams emitted by the light sources, the light-incident side of the beam splitter not being parallel with the light-exiting side of the beam splitter. The beam splitter is a wedge-shaped plate, the light-incident side being more inclined than the light-exiting side with respect to the optical axis. The optical pickup employing the wedge-shaped beam splitter creates an optical spot with little astigmatism on the optical disk. Moreover, using the wedge-shaped beam splitter remarkably reduces manufacturing cost because the wedge-shaped beam splitter, like plate-type beam splitters, does not have the manufacturing difficulties of prism-type beam splitters.

17 Claims, 6 Drawing Sheets

*Conventional Art*

*astigmatic aberration occurred*

*Conventional Art*

*Conventional Art*

*Beam Splitter of Wedge-shaped Plate*

| t (mm) | Φ (deg) θ | 25 | 30 | 35 | 40 | 45 | 50 |
|---|---|---|---|---|---|---|---|
| 0.5 | | 0.368 | 0.502 | 0.595 | 0.647 | 0.661 | 0.639 |
| 0.6 | | 0.573 | 0.699 | 0.784 | 0.827 | 0.828 | 0.789 |
| 0.7 | | 0.772 | 0.890 | 0.968 | 1.000 | 0.989 | 0.934 |
| 0.8 | | 0.996 | 1.076 | 1.146 | 1.170 | 1.146 | 1.074 |
| 0.9 | | 1.155 | 1.258 | 1.320 | 1.334 | 1.298 | 1.211 |
| 1.0 | | 1.339 | 1.434 | 1.489 | 1.494 | 1.446 | 1.343 |
| 1.1 | | 1.518 | 1.606 | 1.654 | 1.650 | 1.590 | 1.472 |
| 1.2 | | 1.692 | 1.773 | 1.814 | 1.801 | 1.729 | 1.598 |
| 1.3 | | 1.863 | 1.936 | 1.970 | 1.949 | 1.866 | 1.720 |

OPTICAL PICKUP APPARATUS HAVING WEDGE-SHAPED BEAM SPLITTER(S)

BACKGROUND OF THE INVENTION

1. Field of the Invention

The present invention relates to an optical pickup apparatus for preventing astigmatic aberration.

2. Description of the Related Art

Optical pickup apparatuses for retrieving/recording data from/on optical disks such as CDs or DVDs employ beam splitters to separate the laser beam emitted by a laser diode from the beam reflected by the optical disk or to separate the optical path for CDs from the optical path for DVDs. Most commonly used beam splitters are prism-type beam splitters and plate-type beam splitters.

FIGS. 1A and 1B depict a prism-type beam splitter comprising two identically-shaped prisms attached to each other. The attached surfaces of the prisms are arranged to be inclined at a predetermined angle, for example 45 degrees, with respect to the optical axis and selectively transmit or reflect impinged beams depending upon the polarization thereof. Two differently-polarized beams B1 and B2 incident upon the surface from different angles are combined into a beam B3 in FIG. 1A, whereas an incident beam B1 is divided into two differently-polarized beams B2 and B3 in FIG. 1B.

FIGS. 2A and 2B depict a plate-type beam splitter placed to be inclined at a predetermined angle with respect to the optical axis. Like the prism-type beam splitter, the surfaces of the plate-type beam splitter selectively transmit or reflect impinged beams depending upon the polarization thereof. Therefore, the plate-type beam splitter functions in much the same was as the prism-type beam splitter does, as shown in FIGS. 2A and 2B. The plate-type beam splitter, however, causes astigmatic aberration since the plate-type beam splitter may be misaligned with the incident light beam as shown in FIG. 3.

To retrieve/record data from/on an optical disk, the laser beam emitted by a laser diode should be focused to a single point on the optical disk. The plate-type beam splitters, therefore, are not appropriate for this purpose and accordingly most optical pickups employ prism-type beam splitters positioned in the light-incident path from the laser diode to the optical disk. The plate-type beam splitters are sometimes used to deliberately induce astigmatic aberration in the optical path from the optical disk to optical detectors.

FIGS. 4A and 4B show the optical characteristics of an optical pickup employing the plate-type beam splitter in the light-incident path from the laser diode to the optical disk. FIG. 4A depicts the wave front error (WFE) characteristic versus optical axis tilt and FIG. 4B depicts the interferogram. For normal operation of the optical pickup, the WFE should remain within $0.07\lambda$ as long as the tilt angle remains within $\pm 2°$. It is easily seen in FIGS. 4A and 4B that the WFE exceeds the required limit and the interferogram is remarkably distorted, which demonstrates the reason why plate-type beam splitters are not acceptable in the light-incident path of the optical pickup.

Meanwhile, FIGS. 5A and 5B show the optical characteristics of an optical pickup employing the prism-type beam splitter in the light-incident path. Unlike the previous example, it is seen that the WFE curves for tangential and radial are almost identical to each other, the WFE satisfies the required condition, and the interferogram shows little distortion.

The prism-type beam splitters, however, increase manufacturing cost since they are much more expensive than the plate-type beam splitters. Moreover, prism-type beam splitters are constructed by attaching two prisms together, however, this joining work of two prisms is a difficult manufacturing process, and having to attach the two sides sometimes degrade the performance of the prism-type beam splitters.

SUMMARY OF THE INVENTION

The invention provides an optical pick apparatus which does not cause astigmatic aberration by employing wedge-shaped beam splitters in the light incident path.

An optical pickup apparatus in accordance with the present invention comprises one or more light sources and beam splitting means which is placed in the light-incident path beginning from the light sources and selectively reflects or transmits the light beams emitted by the light sources, the light-incident side of the beam splitting means not being parallel with the light-exiting side of the beam splitting means. The beam splitting means is a wedge-shaped plate the light-incident side of which is more inclined than the light-exiting side with respect to the optical axis.

Another optical pickup apparatus in accordance with the present invention comprises one or more light sources and wedge-shaped beam splitting means for correcting astigmatic aberration which may arise in the optical path between the light sources and an optical disk. The wedge-shaped beam splitting means is placed between the light sources and the optical disk, projects the incident light beams from the light sources onto the optical disk, and projects the light beams reflected by the optical disk onto an optical detection means.

Another optical pickup apparatus in accordance with the present invention comprises a plurality of light sources and wedge-shaped beam splitting means for refracting incident light beams emitted by the light sources toward different directions.

Another optical pickup apparatus in accordance with the present invention comprises a plurality of light sources placed at different places, wedge-shaped beam splitting means which is placed at the intersection of the light beams emitted by the light sources and refracts incident light beams emitted by the light sources toward different directions, and beam focusing means for focusing the light beam passing through the wedge-shaped beam splitting means on an optical disk.

Another optical pickup apparatus in accordance with the present invention comprises light emitting means and light receiving means placed at different places, first wedge-shaped beam splitting means for refracting incident light beams emitted by the light emitting means and light beams reflected by on optical disk toward different directions, another light source placed at a different place from the light emitting means, second wedge-shaped beam splitting means which is placed at the intersection of the light beams emitted by the light source and the light beams passing through the first wedge-shaped beam splitting means and refracts the light beams emitted by the light source and the light beams passing through the first wedge-shaped beam splitting means toward different directions, and beam focusing means for focusing the light beam passing through the second beam splitting means on the optical disk.

BRIEF DESCRIPTION OF THE DRAWINGS

The accompanying drawings, which are included to provide a further understanding of the invention, illustrate the preferred embodiments of the invention, and together with the description, serve to explain the principles of the present invention.

In the Drawings.

DETAILED DESCRIPTION OF THE PREFERRED EMBODIMENTS

In order that the invention may be fully understood, preferred embodiments thereof will now be described with reference to the accompanying drawings.

Figures 6A, 6B:
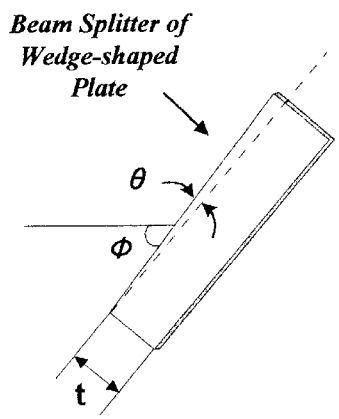
FIGS. 6A and 6B show the wedge-shaped plate in accordance with the present invention and simulation results.

FIGS. 6A and 6B show the shape of the wedge-shaped beam splitter in accordance with the present invention and simulation results for finding an optimal angle of the wedge-shaped beam splitter. The wedge-shaped beam splitter is configured so that the surface, on which the laser beam emitted by the laser diode is incident, is more inclined than the opposite surface by an angle of $\theta$ with respect to the optical axis, as shown in FIG. 6A. The angle $\theta$ optimal for the optical pickup is determined by simulations considering the plate width (t) and incident angle ($\phi$).

Figure 1A:
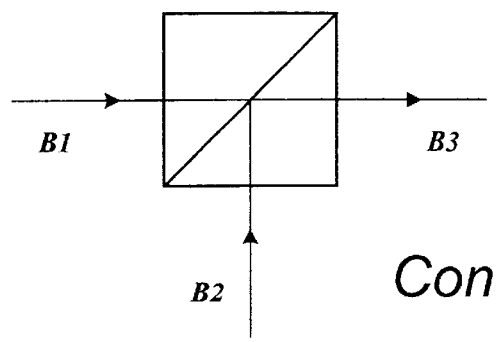
FIGS. 1A and 1B show the principles of a prism-type beam splitter.
Figure 1B:
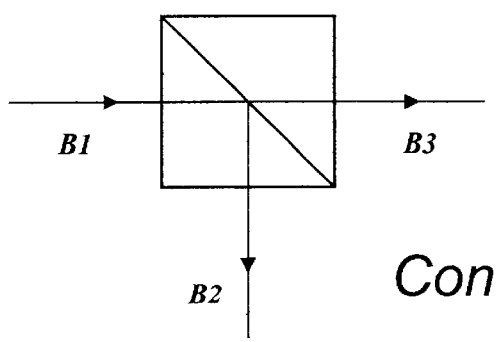
Figure 2A:
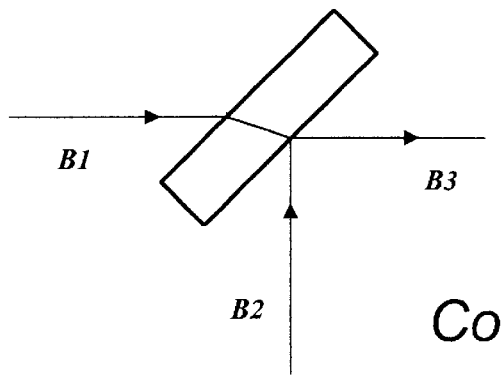
FIGS. 2A and 2B show the principles of a plate-type beam splitter.
Figure 2B:
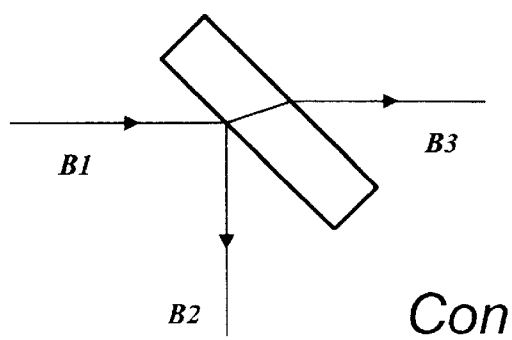
Figure 3:
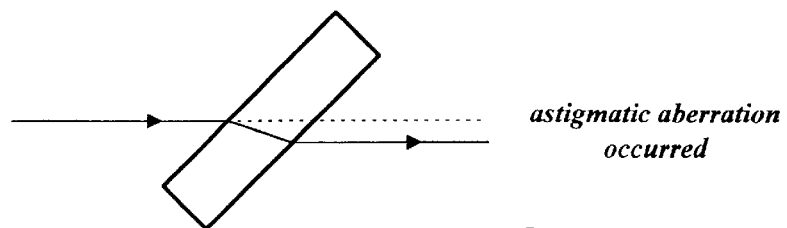
FIG. 3 shows the optical path modified by a plate-type beam splitter.
Figure 4A:
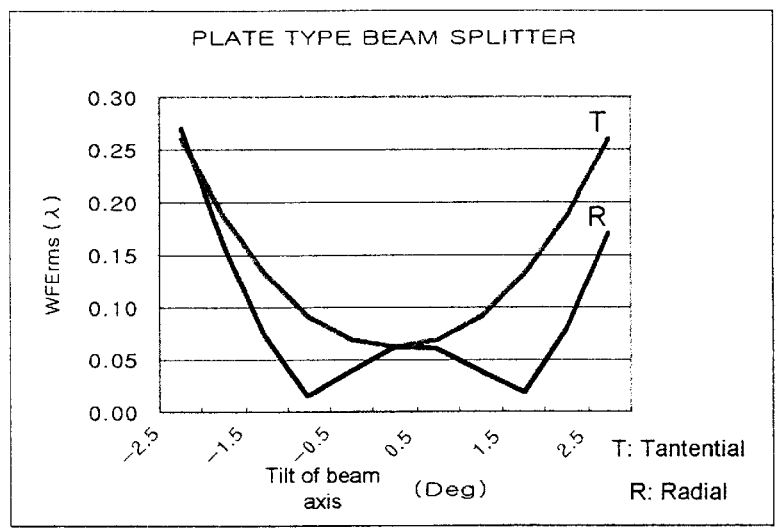
FIGS. 4A and 4B show the optical characteristics obtained by a plate-type beam splitter.
Figure 4B:
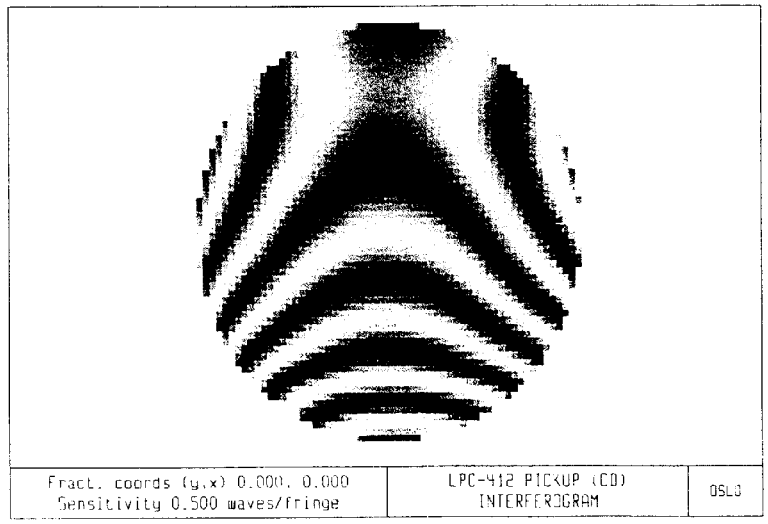
Figure 5A:
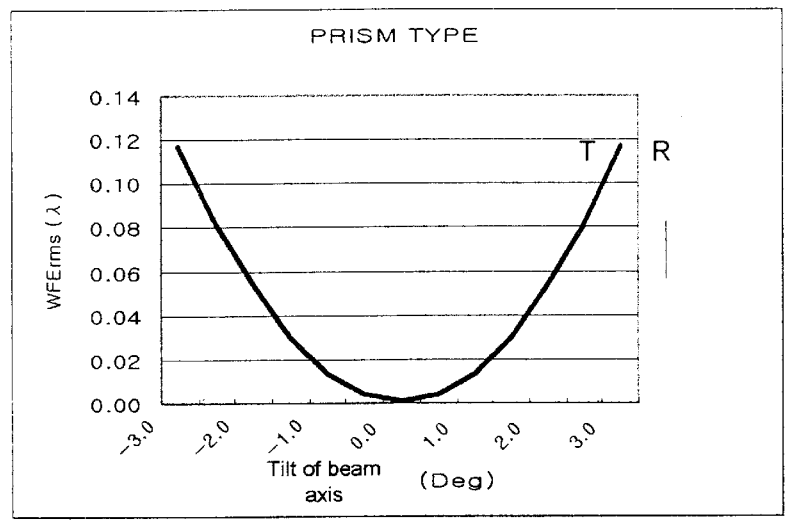
FIGS. 5A and 5B show the optical characteristics obtained by a prism-type beam splitter.
Figure 5B:
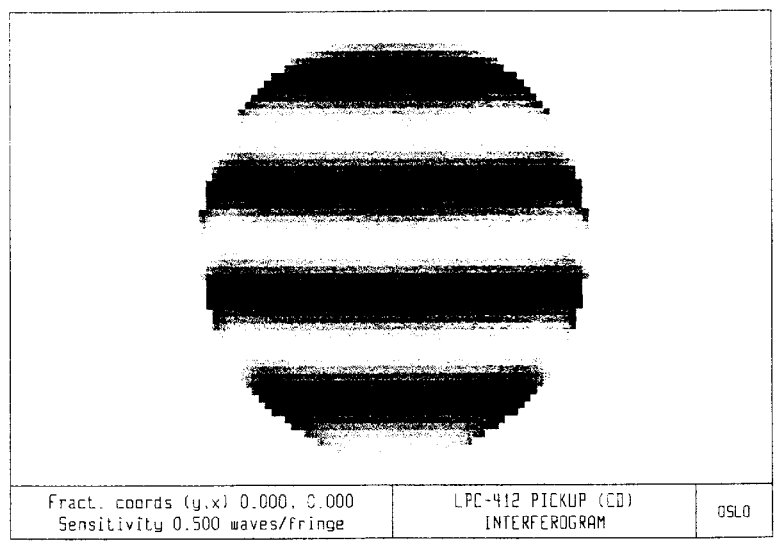
Figure 7A:
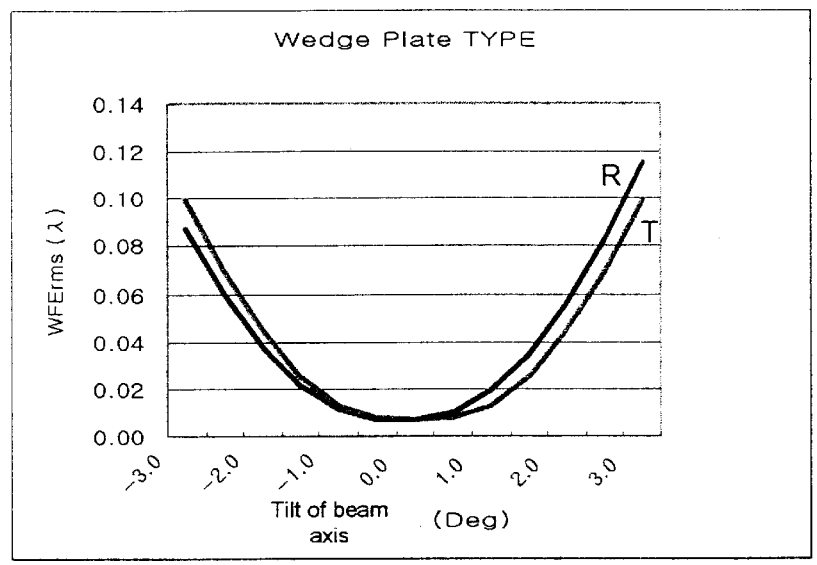
FIGS. 7A and 7B show the optical characteristics obtained by the wedge-shaped plate in accordance with the present invention.
Figure 7B:
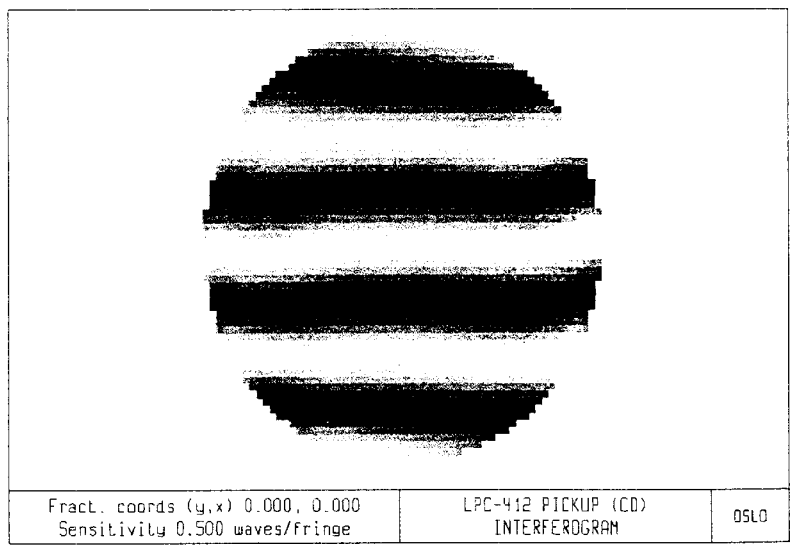

FIGS. 7A and 7B show the wave front error and interferogram obtained when the wedge-shaped beam splitter, having angle $\theta$ based on the simulations, is placed in the light-incident path between the laser diode and the optical disk. It is seen that the optical characteristics of the wedge-shaped beam splitter according to the present invention are very similar to those shown in FIGS. 5A and 5B.

Figure 8:
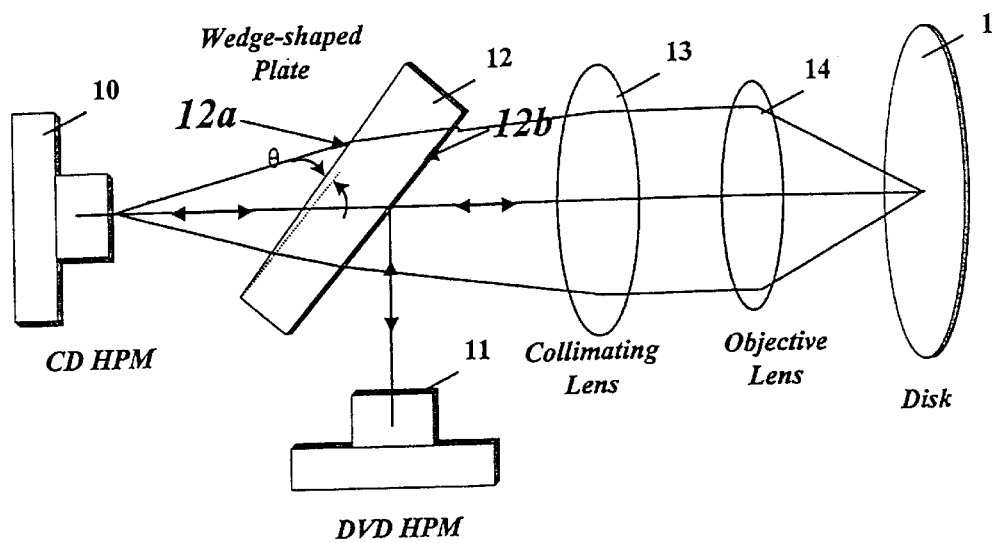
FIG. 8 shows an embodiment of the optical pickup for preventing astigmatic aberration in accordance with the present invention.
Figure 9:
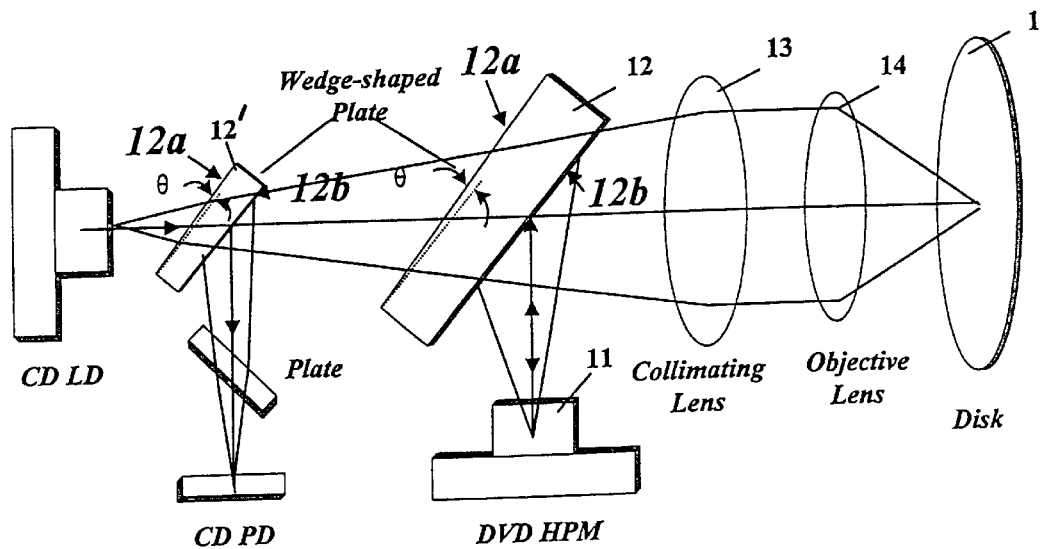
FIG. 9 shows another embodiment of the optical pickup for preventing astigmatic aberration in accordance with the present invention.

FIGS. 8 and 9 show embodiments of an optical pickup employing the wedge-shaped beam splitter of FIGS. 6A and 6B in accordance with the present invention. The pickup apparatus shown in FIG. 8 comprises a CD hologram pickup module (HPM) 10 containing both a laser diode and a photo diode for CDs, a DVD hologram pickup module (HPM) 11 placed at a right angle to the CD HPM 10 with respect to a wedge-shaped beam splitter 12, the wedge-shaped beam splitter 12 for dividing or combining laser beams emitted from the CD HPM 10 and DVD HPM 11, a collimating lens 13 for converting divergent beams received from the wedge-shaped beam splitter 12 into parallel beams, and an objective lens 14 for focusing the parallel beams to a single point on the recording layer of an optical disk 1.

The laser beams from the CD HPM 10 and the DVD HPM 11 are divergent beams, and the wedge-shaped beam splitter 12 is placed in the path of the divergent beams before the collimating lens 13 which converts each divergent beam from the light source into a parallel beam.

The wedge-shaped beam splitter 12 (and a second wedge-shaped beam splitter 12' to be discussed later in connection with FIG. 9) has an inclined surface 12a which is inclined at an angle $\theta$ with respect to an opposite incident surface 12b. The inclined surface 12a is laminated with a light-transmitting material and the incident surface 12b is laminated with a light-reflected material. The wedge-shaped beam splitter 12 (and the second wedge-shaped beam splitter 12' in FIG. 9) is positioned at a light path of divergent or convergent light.

The wedge-shaped beam splitter 12 is placed such that the inclined surface 12a is facing the CD HPM 10 and the incident surface 12b is facing the DVD HPM 11.

Suppose that the wedge-shaped beam splitter has an optimal angle $\theta$ of 1.3° obtained using the simulations in FIG. 6B the plate width (t) and incident angle ($\phi$). The laser beam emitted from the CD HPM 10 passes through the wedge-shaped beam splitter 12 and then enters the collimating lens 13. In this case, the astigmatic aberration of the laser beam is effectively suppressed by the wedge-shaped beam splitter 12.

The collimated laser beam is focused on the recording layer of the optical disk 1 by the objective lens 14. The laser beam is reflected by the optical disk 1 and moves toward the wedge-shaped beam splitter 12. After passing through the wedge-shaped beam splitter 12, the reflected laser beam is collected by the photo diode in the CD HPM 10. The photo diode converts the collected laser beam into electrical signals.

On the other hand, the laser beam emitted from the DVD HPM 11 is reflected by the wedge-shaped beam splitter by 90° and enters the collimating lens 13. The collimated laser beam is focused on the recording layer of the optical disk 1 by the objective lens 14. The laser beam is reflected by the optical disk 1 and moves toward the wedge-shaped beam splitter 12.

The laser beam reflected by the optical disk 1 is reflected again by the wedge-shaped beam splitter 12 by 90° and reaches the DVD HPM 11. The photo diode of the DVD HPM 11 converts the collected laser beam into electrical signals.

In summary, the optimal angle $\theta$ which minimizes the astigmatic aberration can be determined by simulations considering the plate width (t) and incident angle ($\phi$) and the wedge-shaped beam splitter with the angle $\theta$ can be effectively utilized in the optical pickup for recording/retrieving data on/from the optical disk.

In the above-explained embodiment, the angle $\theta$ other than 1.3° can be selected from the range of 1.2°~1.5°, or more preferably a reduced range of 1.25°~1.45°.

Another embodiment of the optical pickup employing two wedge-shaped beam splitters is shown in FIG. 9, wherein the CD HPM 10 is replaced with a CD laser diode (LD), a photo diode (PD) for CDs, and a second wedge-shaped beam splitter 12' placed at the intersection of the light path. Several other different configurations are also possible with the wedge-shaped beam splitter(s) in accordance with the present invention, including the use of multiple wedge-shaped beam splitters of varying sizes, shapes and/or dimensions.

The optical pickup employing the wedge-shaped beam splitter in accordance with the present invention creates an optical spot with little astigmatism on the optical disk. Moreover, using the wedge-shaped beam splitter remarkably reduces manufacturing cost because the wedge-shaped beam splitter, like plate-type beam splitters, does not have the manufacturing difficulties of prism-type beam splitters. The wedge-shaped beam splitter in accordance with the present invention can be usefully employed in optical pickups for DVDs which currently employ more than one prism-type beam splitters.

The invention may be embodied in other specific forms without departing from the sprit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. An optical pickup apparatus for minimizing astigmatic aberrations, comprising:

a first light source and a first light detector placed separately;

a first wedge-shaped beam splitter placed at a light path of divergent or convergent light and having a first side opposing a second side;

a second light source placed apart from said first light source;

a second wedge-shaped beam splitter, placed at a light path of divergent or convergent light and at an intersection of light beams emitted by said second light source and light beams passing through said first wedge-shaped beam splitter, said second wedge-shaped beam splitter having a first side opposing a second side;

a beam focuser to focus light beams passing through said second wedge-shaped beam splitter toward an optical recording medium; and a hologram pick-up module including said second light source and a second light detector, wherein said first light detector receives a light reflected from said first wedge-shaped beam splitter, and said second light detector receives a light reflected from said second wedge-shaped beam splitter, and wherein said first and second sides of each of said first and second wedge-shaped beam splitters are not parallel to each other.

2. The apparatus set forth in claim 1, wherein said first and second wedge-shaped beam splitters each have an angle difference of 1.2°~1.5° between its two opposing sides with respect to an axis of an incident light beam.

3. The apparatus set forth in claim 2, wherein said first and second wedge-shaped beam splitters have an angle difference of 1.25°~1.45°.

4. The apparatus set forth in claim 1, wherein the first and second light sources generate light beams for impinging on a CD and a DVD, respectively.

5. The apparatus set froth in claim 1, wherein the hologram pick-up module is for recording or reproducing information to or from a DVD.

6. The apparatus set forth in claim 1, wherein the first wedge-shaped beam splitter is disposed in parallel with the second wedge-shaped beam splitter.

7. The apparatus set forth in claim 6, wherein the first and second wedge-shaped beam splitters are aligned along a light path of a light beam generated from the first light source.

8. The apparatus set froth in claim 1, wherein light beams impinge on said first and second sides of said first and second wedge-shaped beam splitters.

9. An optical pickup apparatus for minimizing astigmatic aberrations, comprising:

a first light source and a first light detector placed separately;

a first wedge-shaped beam splitter placed at a light path of divergent or convergent light and having different inclination angles with respect to light beams incident thereto;

a second light source placed apart from said first light source;

a second wedge-shaped beam splitter, placed at a light path of divergent or convergent light and at an intersection of light beams emitted by said second light source and light beams passing through said first wedge-shaped beam splitter, said second wedge-shaped beam splitter having different inclination angles with respect to light beams incident thereto;

a beam focuser to focus light beams passing through said second wedge-shaped beam splitter toward an optical recording medium; and a hologram pick-up module including said second light source and a second light detector, wherein said first light detector receives a light reflected from said first wedge-shaped beam splitter, and said second light detector receives a light reflected from said second wedge-shaped beam splitter.

10. The apparatus set forth in claim 9, wherein said first and second wedge-shaped beam splitters each have an angle difference of 1.2°~1.5° between its two opposing sides with respect to an axis of an incident beam.

11. The apparatus set forth in claim 9, wherein said first and second wedge-shaped beam splitters have an angle difference of 1.25°~1.45°.

12. The apparatus set forth in claim 9, wherein the first and second light sources generate light beams for impinging on a CD and a DVD, respectively.

13. The apparatus set forth in claim 9, wherein the hologram pick-up module is for recording or reproducing information to or from a DVD.

14. The apparatus set forth in claim 9, wherein the first wedge-shaped beam splitter is disposed in parallel with the second wedge-shaped beam splitter.

15. The apparatus set forth in claim 9, wherein the first and second wedge-shaped beam splitters are aligned along a light path of a light beam generated from the first light source.

16. An optical pickup apparatus comprising:

a first light source and a first light detector placed separately;

a first wedge-shaped beam splitter to pass therethrough a light from the first light source and to reflect a first impinging return light onto the first light detector;

a hologram pickup module including a second light source and a second light detector; and a second wedge-shaped beam splitter placed at an intersection of a light emitted by the second light source and the light passing through the first wedge-shaped beam splitter, wherein the second wedge-shaped beam splitter passes therethrough the light passed through the first wedge-shaped beam splitter, and reflects a second impinging return light onto the second light detector.

17. The optical pickup apparatus of claim 16, where the first wedge-shaped beam splitter is disposed in parallel with the second wedge-shaped beam splitter.

* * * * *